United States Patent [19]

Domkowski et al.

[11] Patent Number: 5,171,027
[45] Date of Patent: Dec. 15, 1992

[54] HIGH TEMPERATURE AND PRESSURE FLUID SEAL

[75] Inventors: Ronald A. Domkowski, Arlington Heights; George H. Johnson, Elgin, both of Ill.; Vinay K. Nilkanth, Burbank, Calif.

[73] Assignee: Parker-Hannifin Corporation, Cleveland, Ohio

[21] Appl. No.: 830,018

[22] Filed: Jan. 31, 1992

[51] Int. Cl.⁵ ............................................. F16J 15/34
[52] U.S. Cl. .................................. 277/173; 277/177; 277/27; 277/215
[58] Field of Search .................. 277/94, 173, 177, 215, 277/27, 201, 138, 165, 75, 70, 216, 174, 176

[56] References Cited

U.S. PATENT DOCUMENTS

| | | | |
|---|---|---|---|
| 1,936,430 | 11/1933 | Godron | 277/70 |
| 1,988,726 | 1/1935 | Godron | 277/27 |
| 2,042,820 | 6/1936 | Bax | 277/215 |
| 2,444,119 | 6/1948 | Thorn et al. | 277/177 |
| 2,893,795 | 7/1959 | Dooling | 277/177 |
| 3,033,578 | 5/1962 | Kellogg | 277/201 |
| 3,100,647 | 8/1963 | Lee et al. | 277/201 |
| 3,214,182 | 10/1965 | Herbruggen | 277/201 |
| 3,521,893 | 7/1970 | Josephson | 277/176 |
| 3,617,349 | 11/1971 | Prasse | 277/235 A X |
| 3,663,024 | 5/1972 | Traub | 277/176 X |
| 3,743,303 | 7/1973 | Pope | 277/173 X |
| 3,887,198 | 6/1975 | McClure et al. | 277/27 |
| 4,102,608 | 7/1978 | Balkan et al. | 277/205 X |
| 4,165,079 | 8/1979 | Clements | 277/27 X |
| 4,289,264 | 9/1981 | Rawlins | 277/173 X |
| 4,504,069 | 3/1985 | Stenlund | 277/27 X |
| 4,580,790 | 4/1986 | Doose | 277/228 |
| 4,614,348 | 9/1986 | Fournier | 277/165 X |
| 4,681,817 | 7/1987 | Shinada | 277/235 A X |
| 4,702,482 | 10/1987 | Oseman | 277/165 |
| 4,723,782 | 2/1988 | Müller | 277/75 |
| 4,824,125 | 4/1989 | Eiermann et al. | 277/215 |
| 5,088,745 | 2/1992 | Peppiatt et al. | 277/27 X |

FOREIGN PATENT DOCUMENTS

| | | | |
|---|---|---|---|
| 3703360 | 8/1988 | Fed. Rep. of Germany | 277/94 |
| 0069171 | 4/1982 | Japan | 277/27 |
| 1468658 | 3/1977 | United Kingdom | 277/138 |

Primary Examiner—William A. Cuchlinski, Jr.
Assistant Examiner—James K. Folker
Attorney, Agent, or Firm—Ralph E. Jocke

[57] ABSTRACT

A ring shaped seal (10) for preventing fluid flow through a gap (32) between a rotating shaft (30) and a cylindrical wall (34) is positioned in a groove (28) in the shaft. The seal has, in cross section, a generally rectangular body (11) that has a slightly lesser width than the width of the groove. The body has a first end wall (12) that includes first pockets (18) and a second end wall (14) that includes second pockets (20). The seal has an outer wall (22) with a contact portion (26) that is in abutting contact with the cylindrical wall. When a higher pressure is applied on one side of the seal, the end wall of the seal on the side away from the higher fluid pressure is pushed against a side wall of the groove. The pockets in the end wall of the seal that is pushed against the groove, are open to the higher pressure and exert a force which counteracts the forces pushing the end wall of the seal against the side of wall of the groove. The pockets also provide lubrication at the abutting walls of the seal and groove which reduces wear and extends seal life.

7 Claims, 4 Drawing Sheets

HIGH TEMPERATURE AND PRESSURE FLUID SEAL

TECHNICAL FIELD

This invention relates to fluid seals. Specifically, this invention relates to a seal for preventing the flow of high pressure and temperature fluid through a gap surrounding a rotating shaft in an automatic transmission of an automobile.

BACKGROUND ART

In automatic transmissions of automobiles, fluid pressure is used to engage clutches and shift the transmission between its various gears. The fluid in such automatic transmissions is often at high temperatures and pressures. As a result, the seals used in automatic transmissions are frequently required to withstand severe operating conditions.

Some automotive transmission designs transmit fluid pressure through cylindrical gaps or cavities surrounding a rotating shaft. In such designs, the seals are positioned in grooves that extend circumferentially about the shaft. The seals are generally ring shaped and rectangular in cross section. The seals span the gaps between the shaft and a surrounding cylindrical wall which bounds the gaps.

In some transmissions which have seals of this type, fluid pressure applies a sideways or axial force to the seal. These forces can cause the seal to deform and extrude into the gap between the outer wall of the shaft and the cylindrical wall bounding the gap. The axial forces can also cause the sides of the seals to wear rapidly as the seal is pushed against the walls of the groove.

In such automatic transmission applications, the seals are subjected to alternative pressure forces in both directions. This occurs as the transmission changes gears. These periodic forces in alternating directions can rapidly wear a seal and cause failure.

Thus, there exists the need for a seal that can prevent fluid flow through a gap between a shaft and a cylindrical wall bounding the gap in an automatic transmission. There is a further need for a seal that can withstand high fluid temperatures and pressures, and which has a longer service live.

DISCLOSURE OF INVENTION

It is an object of the present invention to provide a seal for preventing fluid flow through a gap between a shaft and a cylindrical wall bounding said gap that can resist high fluid pressures.

It is a further object of the present invention to provide a seal for preventing fluid flow through a gap between a shaft and a cylindrical wall bounding said gap that can withstand high fluid temperatures.

It is a further object of the present invention to provide a seal for preventing fluid flow through a gap between a shaft and a cylindrical wall bounding said gap that can withstand pressures alternatively applied from both directions.

It is a further object of the present invention to provide a seal for preventing fluid flow through a gap between a shaft and a cylindrical wall bounding said gap that has an extended service life.

Further objects of the present invention will be made apparent in the following Best Modes for Carrying Out Invention and the appended claims.

The foregoing objects are accomplished in the preferred embodiment of the invention by a seal for preventing the flow of liquid under pressure between a first area at a high pressure and a second area at a lower pressure. The seal extends across a gap between an outer wall of a shaft and a cylindrical wall bounding the gap. The shaft is positioned in centered relation with respect to the cylindrical wall and rotates relative thereto.

The seal is generally ring shaped and is positioned in a circumferentially extending groove in the shaft. The groove is rectangular in cross section and has first and second radially extending end walls and a bottom wall bounding the groove.

The seal has a body that is generally rectangular in cross section.

The body is somewhat smaller in width than the groove in which it resides. As a result, the seal is enabled to move slightly back and forth in an axial direction in the groove. The seal has first and second end walls adjacent the first and second side walls of the groove respectively, as well as a inner wall adjacent the bottom wall of the groove. The seal is sized in diameter so that the inner wall has a somewhat greater diameter than the diameter of the shaft at the bottom wall of the groove.

The first end wall of the seal has a pair of first pockets therein. The pockets are generally rectangular in cross section. They extend radially outward from the inner surface of the seal to an area somewhat below the shaft wall. The first pockets have openings in the face of the seal which are open towards the first side wall of the groove. The pockets are positioned 180° apart in the first end wall of the seal.

The second end wall of the seal has a pair of second pockets similarly configured to the first pockets. The second pockets are spaced 90° relative to the first pockets in the first end wall of the seal.

The body of the seal, in cross section, is tapered inwardly in the area which extends radially beyond the groove. The body contacts the cylindrical wall at a flat contact portion. The contact portion is substantially smaller in width than the body of the seal in the area of the groove.

In operation, fluid pressure pushes the seal against one of the side walls of the shaft groove depending on the area in which the higher pressure is applied. The fluid pressure is transmitted through the groove around the seal on the high pressure side because the seal is slightly less in width than the width of the groove in the shaft. The pressure is also transmitted to the inner area between the inner wall of the seal and bottom wall of the groove. The fluid pressure is further transmitted from the inner area to the pockets on the side of the seal where the end wall of the body is pressed against the wall of the groove. The fluid pressure in the pockets applies a force to the seal body which partially counteracts the force of the fluid pressure pressing the seal body against the wall of the groove. However, this balancing force is not sufficient to enable fluid to leak past the abutting walls of the seal and groove.

Fluid is also maintained in the pockets on the side of the seal where the body is pressed against the side wall of the groove. The presence of the fluid in the pockets provides lubrication which reduces wear.

When the area of high fluid pressure changes, the seal moves in the groove so that the end wall of the seal body away from the fluid pressure is pressed against the wall of the groove away from the pressure. However, the effect of the fluid pressure acting in the pockets serves to counteract the pressure force applied to the seal and provides lubrication to minimize wear.

BEST MODES FOR CARRYING OUT INVENTION

Figure 1:
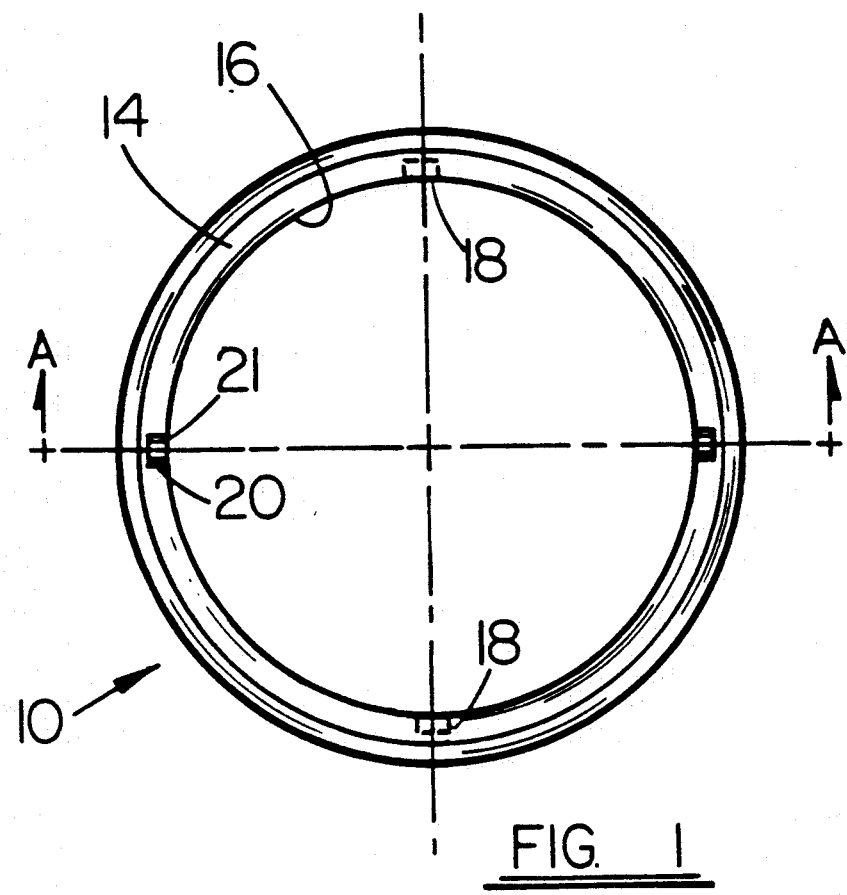
FIG. 1 is a plan view of a first preferred embodiment of the seal of the present invention.
Figure 2:
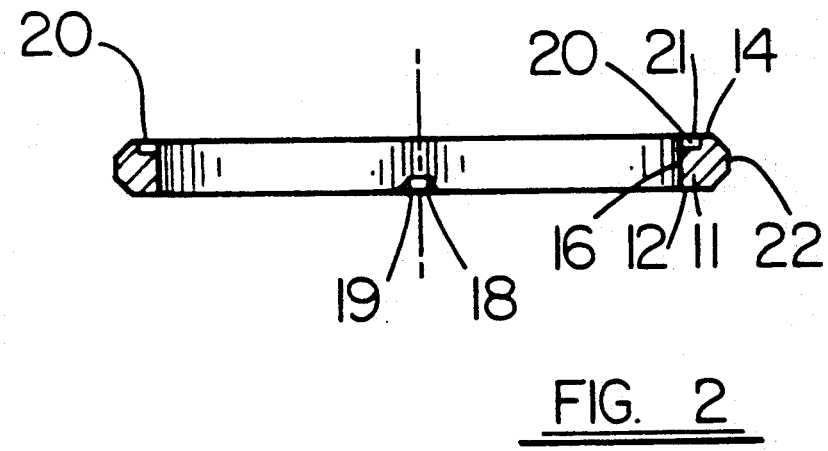
FIG. 2 is a cross sectional view of the seal shown in FIG. 1 taken along line A—A

Referring now to the drawings and particularly to FIG. 1, there is shown therein a first preferred embodiment of the seal of the present invention generally indicated 10. Seal 10 is generally ring shaped. The seal has a body 11 bounded in cross section by a first end wall 12 (see FIGS. 2 and 3) and a second end wall 14. Body 11 also has an inner wall 16.

First end wall 12 has a pair of first pockets 18 positioned therein. First pockets 18 are rectangular in cross section and are positioned 180° apart. First pockets 18 are bounded by body 11 and extend radially inward through inner wall 16. The first pockets also have first openings 19 in the first end wall of the seal.

Figure 3:
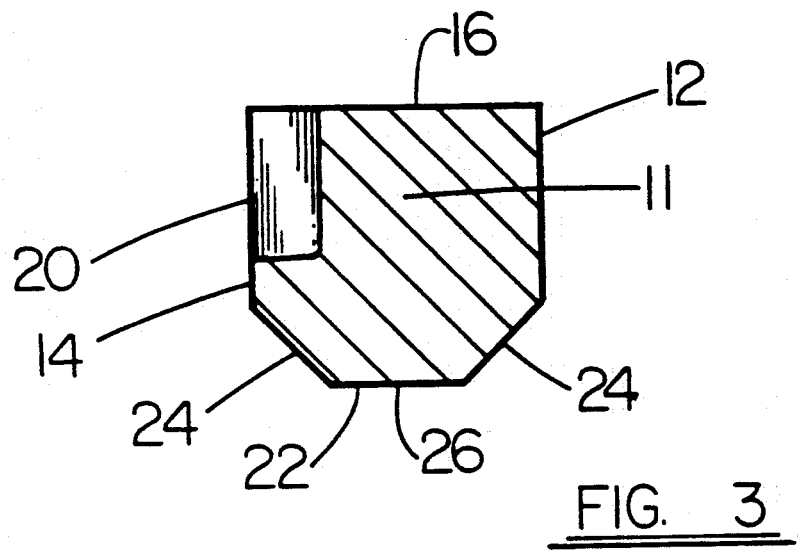
FIG. 3 is an enlarged cross sectional view of the body of the seal.
Figure 4:
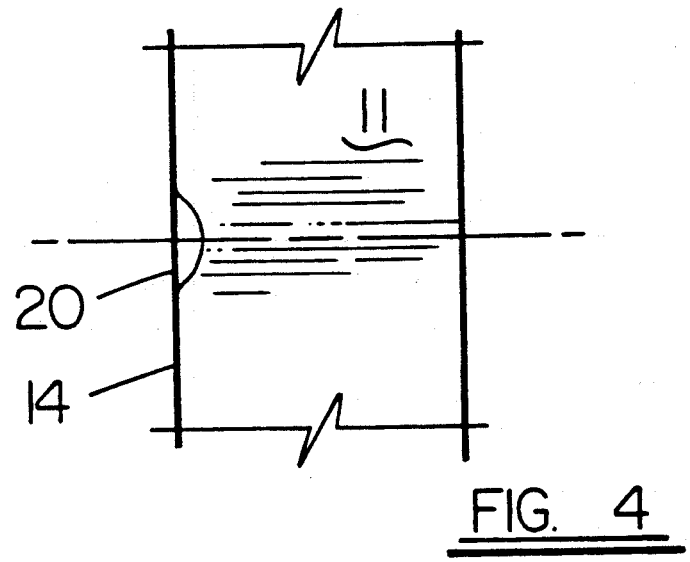
FIG. 4 is a side view of one of the pockets of the seal.

Second end wall 14 has a pair of second pockets 20. Second pockets 20 are similarly configured to first pockets 18 and have second openings 21 which extend through second wall 14. Body 11 of seal 10 is bounded by an outer wall 22. As best shown in FIG. 3, outer wall 22 has two tapered portions 24. Tapered portions 24 are tapered radially inward with increasing radial distance from the center of seal. Outer wall 22 also has a flat contact portion 26.

Figure 5:
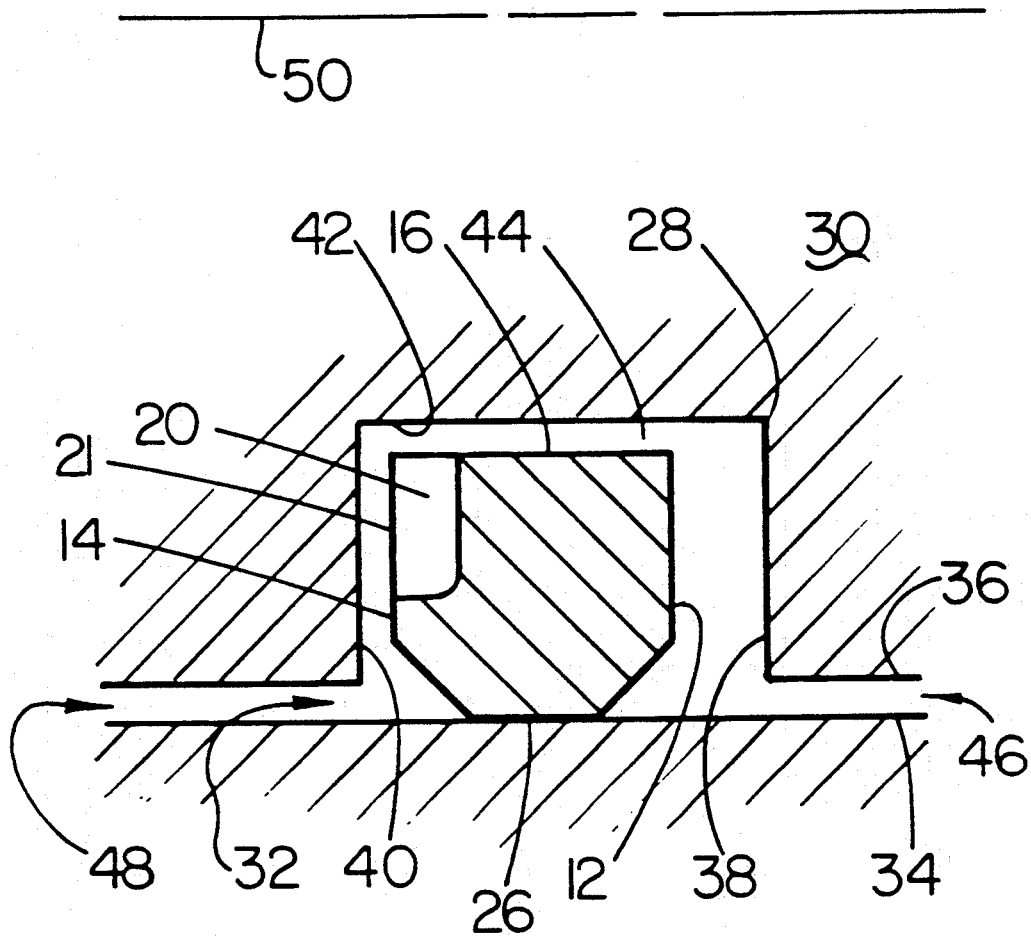
FIG. 5 is a cross sectional view of the seal positioned in a groove of a shaft and sealing a gap between the shaft and a cylindrical wall.

When seal 10 of the present invention is used in an automatic transmission of a vehicle or other application, it is mounted in a circumferentially extending groove 28 in a shaft 30, as shown in FIG. 5. The shaft extends through a gap generally indicated 32.

The gap is bounded by a cylindrical wall 34 and a shaft wall 36 of the shaft.

Groove 28 has a first side wall 38 which is adjacent first end wall 12 of the seal when the seal is positioned in the groove. The groove has a second side wall 40 which is adjacent second end wall 14 of the seal. The groove also has a bottom wall 42 which extends between the side walls. Bottom wall 42 is slightly smaller in diameter than the inner wall 16 of the seal so that the inner wall is slightly radially disposed therefrom. Bottom wall 42 of the groove, and inner wall 16 of the seal, bound an inner area generally indicated 44. As shown in FIG. 5, the width of seal body 11 is somewhat less than the width of groove 28.

When the seal is installed in the groove as shown in FIG. 5, the tapered outer wall extends outward beyond the shaft wall. The flat contact portion 26 of the seal is in abutting contact with the cylindrical wall 34. Further, when the seal is installed in the groove, the first and second openings 19 and 21 respectively, are positional radially inward of the shaft wall.

In operation, seal 10 blocks fluid flow through the gap. As shown in FIG. 5, the seal prevents the flow of fluid from a first area 46 of high fluid pressure, which is shown to the right in FIG. 5. A second area, 48 which has a lower fluid pressure in the condition of the seal shown, is generally to the left. The fluid pressure in the first area pushes the seal body 11 to the left as shown in FIG. 5. This causes second end wall 14 of the body to be pushed against second side wall 40 of the groove 28. Because the body of the seal is not as wide as the groove, fluid pressure is transmitted to inner area 44. This results in a force which pushes radially outward against inner wall 16 of the seal. This force aids in holding contact portion 26 in abutting contact with cylindrical wall 34.

The fluid pressure in inner area 44 also is transmitted to second pockets 20. The fluid pressure in the pockets 20 pushes through the second openings 21 against the second side wall of the groove. The fluid pressure in the pockets partially counteracts the pressure force which is applied from right to left on the seal as shown in FIG. 5. This reduces the overall force of the seal pressing against the groove and minimizes wear. The counteracting force is not sufficient to lose the sealing effect between the abutting walls of the seal and groove, however. In addition, the pockets also provide reservoirs o fluid which lubricates the contact area of the second end wall 14 of the seal and the second side wall 40 of the groove. This further reduces seal wear.

In the preferred embodiment of the invention the side walls of the groove are highly polished which further serves to reduce wear and provides the maximum benefit from the available lubrication. As a result, the seal is enabled to effectively prevent the flow of fluid through the ga without extruding.

When the pressure conditions in the automatic transmission or other device in which the seal is used, are changed so that the area of high pressure is on the left as shown in FIG. 5, the seal will continue to prevent fluid flow. When the pressure rises on the left side and falls on the right, the seal body will move in an axial direction parallel to a central axis 50 of the shaft until first end wall 12 of the seal is in abutting contact with first side wall 38 of the groove. In this condition, the first pockets 18 are exposed to fluid pressure and serve to partially counteract the pressure force and provide lubrication at the abutting faces of the seal and groove.

Figure 7:
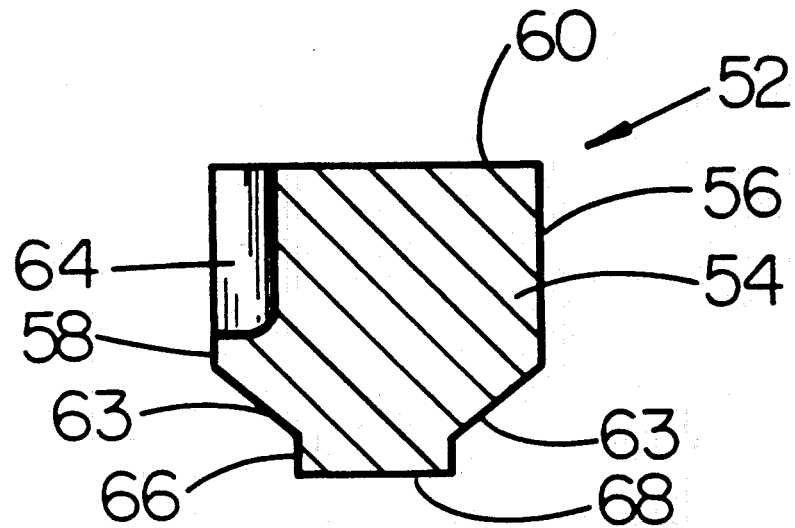
FIG. 7 is an enlarged cross sectional view of the seal shown in FIG. 6.
Figure 6:
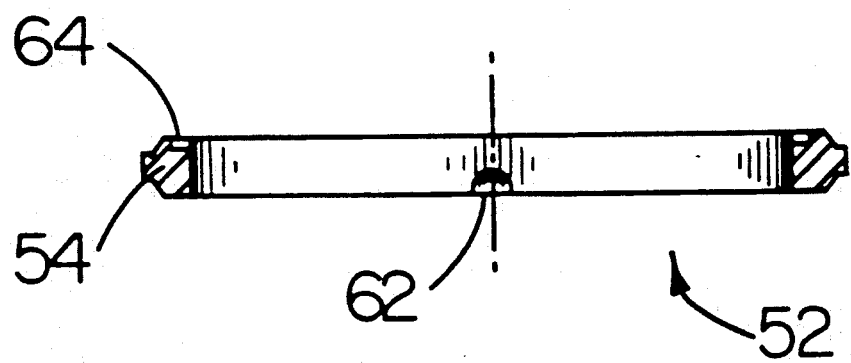
FIG. 6 is a cross sectional view of a second preferred embodiment of the seal of the present invention.

An alternative preferred embodiment of the seal of the present invention, generally indicated 52, is shown in FIGS. 6 and 7. Like the embodiment previously described, seal 52 is ring shaped and in cross section and has a body 54 which is bounded by a first end wall 56, a second end wall 58 and a bottom wall 60. The seal also has first pockets 62 and second pockets 64, which are similar to those of the previously described embodiment.

Seal 52, in cross section also has inwardly tapered portions 63. A contact portion 64 of seal 52 includes a raised area 66 which extends radially outward beyond the tapered portions 63, and terminates in a flat face 68.

Seal 52 operates in a manner similar to seal 10. The wider profile of seal 52 provides enhanced stability and resistance to deformation. The configuration of raised area 66 and tapered portions 63 also provides enhanced resistance to seal deformation. Such characteristics may be desirable in demanding applications.

It will be understood by those skilled in the art that the pockets of the preferred embodiments serve as both fluid holding means, as well as fluid conduit means for transmitting fluid pressure from the inner area. In other embodiments, other holding means and conduits may be used. Also, depending on the fluid and temperature involved in other embodiments, a seal may require only fluid holding means in its end face without a conduit to the area of high fluid pressure. These reservoirs may provide a sufficient source of lubrication as well as a reservoir of incompressible fluid which sufficiently counteracts the forces applied by fluid pressure on the opposite side of the seal.

In the preferred forms of the invention shown in FIGS. 1–7, the seals are of unitary construction and made from a tough, relatively dimensionally stable, plastic compound. In certain embodiments, the seal is comprised of a compound having 28% glass fiber, 10% graphite and 62% PTFE. Seals may also be made with a compound having 55% bronze, 5% molybdenum and 40% PTFE. Further embodiments of the invention may be made from a compound having 10% mica and 90% PTFE.

Seals comprised of the above described compounds are able to satisfactorily withstand environments in automatic transmissions where the working fluid is automatic transmission fluid such as "Dextron" or an equivalent. The operating temperatures range from $-40°$ C. to $+150°$ C. and the relative shaft to wall speed is 0–6500 rpm. Differential pressures in such applications across the seal may reach 1900 KPa.

In other embodiments, other compounds for the body of the seal may be used depending on the service conditions. Also, in other embodiments it may be desirable to use more or less pockets and/or the areas of the openings of the pockets may be varied depending on the need for counter balancing forces or lubrication.

Thus, the high temperature and pressure seal of the present invention achieves the above stated objections, eliminates difficulties encountered in the use of prior devices and systems, solves problems and attains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown or described.

Having described the features, discoveries and principles of the invention, the manner in which it is constructed and operated and the advantages and useful results obtained, the new and useful structures, devices, elements, arrangements, parts, combinations, systems, equipment, operations and relationships are set forth in the appended claims.

We claim:

1. A seal for preventing flow of liquid under pressure between a first area and a second area through a gap, said gap extending between a cylindrical wall and a shaft rotating in relative relation to said cylindrical wall, said shaft extending in centered relation of said gap, said shaft bounded radially by a shaft wall, said shaft including a circumferentially extending groove therein, said groove bounded by a first radially extending side wall adjacent said first area, a second radially extending side wall disposed opposite of said first side wall adjacent said second area, and a bottom wall extending between said side walls;

said seal comprising a generally ring shaped body, and including in cross section;

a first end wall bounding said body, said first end wall adjacent and extending generally parallel of said first wall of said groove, said first end wall including at least one first pocket therein for holding said liquid, said first pocket bounded by said body and having a first opening extending in a radial direction in said first end wall, said first opening disposed radially inward of said shaft wall;

a second end wall bounding said body adjacent and extending generally parallel of said second side wall of said groove, said second end wall including at least one second pocket therein for holding said liquid, said second pocket bounded by said body and having a second opening extending in the radial direction in said second end wall, said second opening disposed radially inward of said shaft wall;

an inner wall bounding said body, said inner wall extending between said end walls and disposed from said bottom wall of said groove, said first and second pockets extending through said inner wall and in the radial direction outward from said inner wall; and an outer wall bounding said body in the radial direction, said outer wall extending between said end walls and having a generally flat contact portion in abutting contact with said cylindrical wall, said outer wall including tapered portions bounding said contact portion, said tapered portions extending inward with increasing radial distance from said shaft wall said outer wall further including a raised area extending outward in the radial direction beyond said tapered portions, and said raised area being bounded by generally parallel radially extending surfaces extending from said tapered portions to said raised area.

2. The seal according to claim 1 wherein said groove in said shaft is generally rectangular in cross section and said seal body is generally rectangular in cross section, and said groove has a groove width in a direction parallel of a longitudinal axis of said shaft, and said body has a body width in said direction, and wherein said body width in the uncompressed condition of said seal is less than said groove width.

3. The seal according to claim 2 and wherein said body includes a plurality of first pockets, said first pockets being generally evenly spaced radially about said seal, said first pockets being generally rectangular in cross section and extending radially outward from said inner wall.

4. The seal according to claim 3 wherein said body includes a plurality of second pockets, said second pockets being generally evenly spaced radially about said seal, said second pockets being generally rectangular in cross section and extending radially outward from said bottom wall.

5. The seal according to claim 4 wherein said seal body consists essentially of twenty-eight percent (28%) glass fiber, ten percent (10%) graphite and sixty-two percent (62%) PTFE material.

6. The seal according to claim 4 wherein said seal body consists essentially of fifty-five percent (55%) bronze, five percent (5%) molybdenum and forty percent (40%) PTFE material.

7. The seal according to claim 4 wherein said body consists essentially of ten percent (10%) mica and ninety percent (90%) PTFE material.

* * * * *